No. 760,144. PATENTED MAY 17, 1904.
V. OPPL.
BEER COOLING APPARATUS.
APPLICATION FILED APR. 20, 1903.
NO MODEL. 3 SHEETS—SHEET 1.
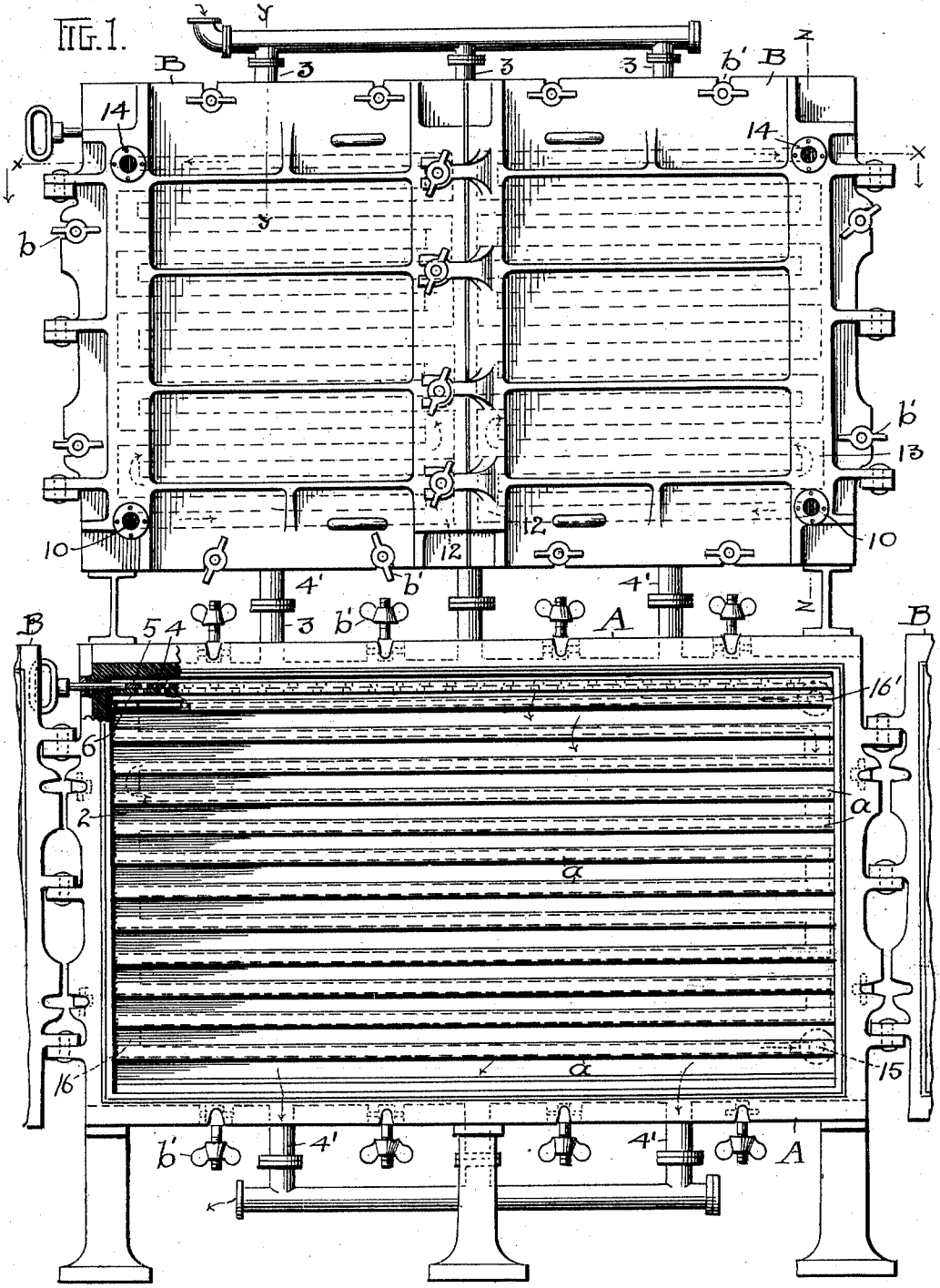

No. 760,144. PATENTED MAY 17, 1904.
V. OPPL.
BEER COOLING APPARATUS.
APPLICATION FILED APR. 20, 1903.
NO MODEL. 3 SHEETS—SHEET 2.
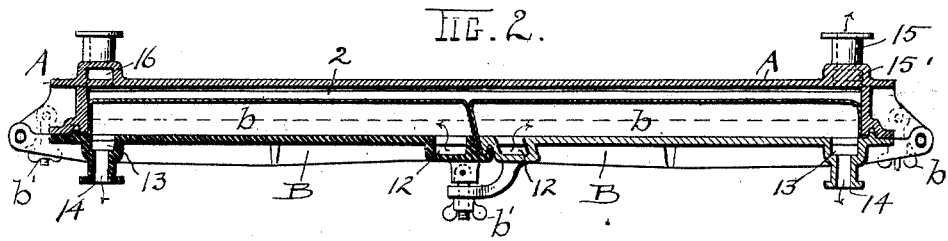
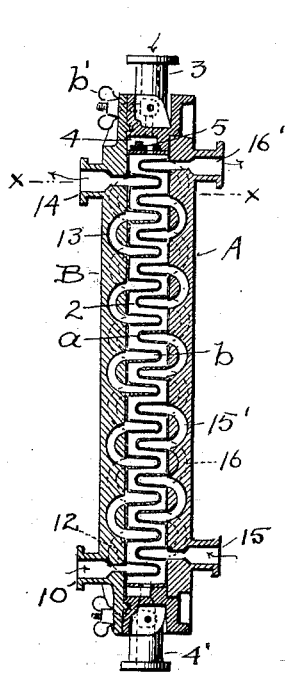
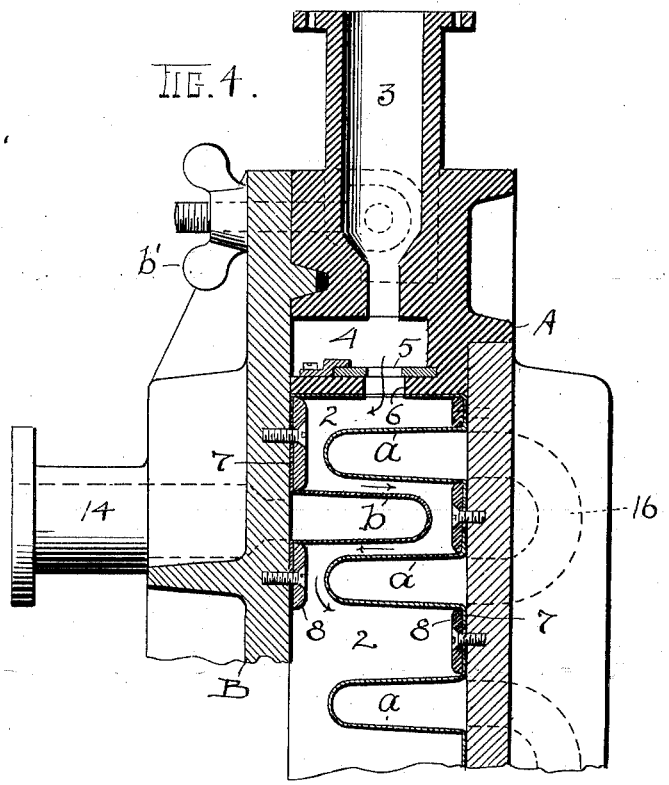
Witnesses.
T. B. Moser
E. M. Fisher
Inventor,
Valentin Oppl
By H. T. Fisher Atty No. 760,144. PATENTED MAY 17, 1904.
V. OPPL.
BEER COOLING APPARATUS.
APPLICATION FILED APR. 20, 1903.
NO MODEL. 3 SHEETS—SHEET 3.
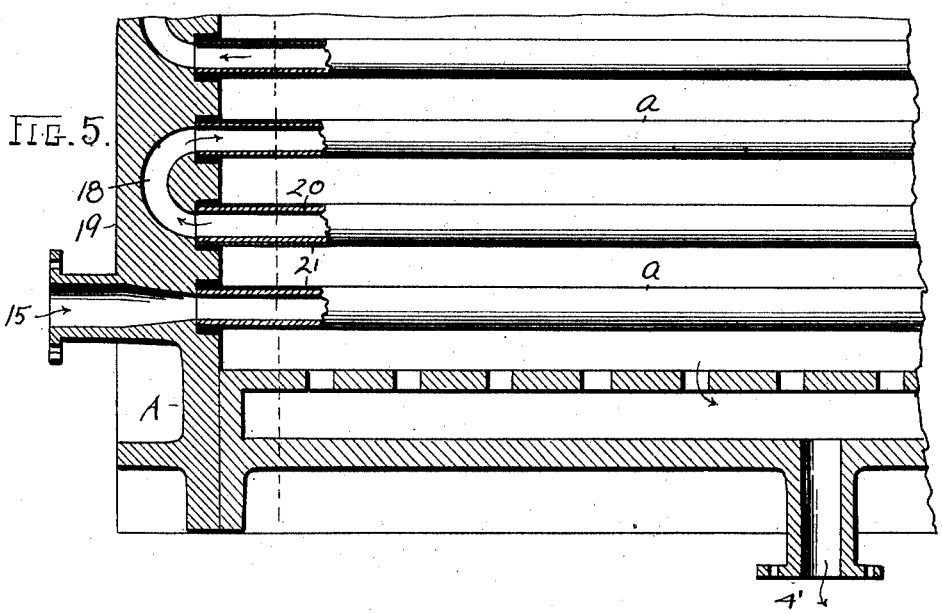
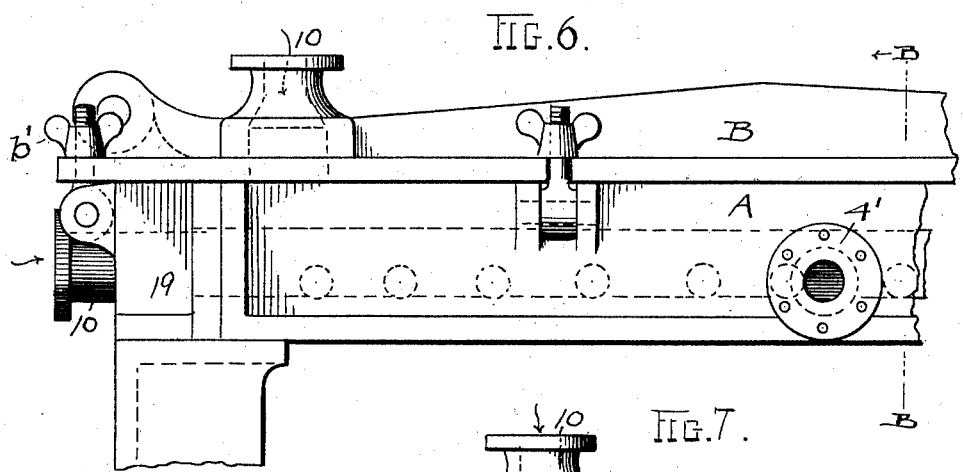
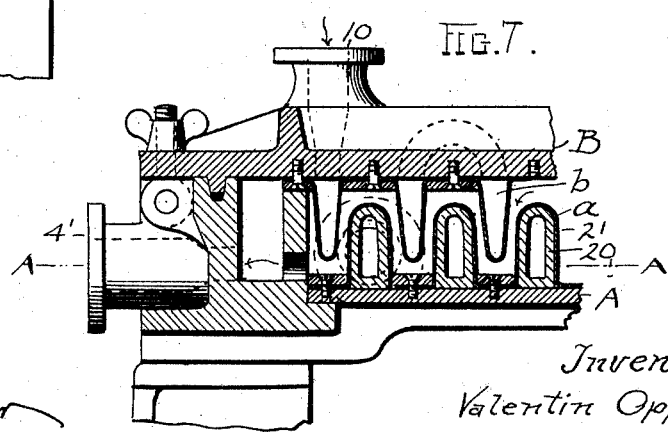
Witnesses.
R. B. Moser
E. M. Fisher
Inventor
Valentin Oppl.
By H. T. Fisher Atty No. 760,144. Patented May 17, 1904.

UNITED STATES PATENT OFFICE.

VALENTIN OPPL, OF CLEVELAND, OHIO.

BEER-COOLING APPARATUS.

SPECIFICATION forming part of Letters Patent No. 760,144, dated May 17, 1904.

Application filed April 20, 1903. Serial No. 153,405. (No model.)

*To all whom it may concern:*

Be it known that I, VALENTIN OPPL, a citizen of the United States, residing at Cleveland, in the county of Cuyahoga and State of Ohio, have invented certain new and useful Improvements in Beer-Cooling Apparatus; and I do declare that the following is a full, clear, and exact description of the invention, which will enable others skilled in the art to which it appertains to make and use the same.

My invention relates to beer-cooling apparatus, and is an improvement in the class of apparatus which cools the beer shortly after it is brewed and wherein cold water, brine, or ammonia is employed as a cooling agent, all substantially as shown and described, and particularly pointed out in the claims.

The object of my improvement is to provide a construction whereby a large volume of beer is caused to flow free and rapidly in a thin film or sheet over and between a large area of cooling-surfaces, both the beer and the cooling agent flowing through circuitous or tortuous channels to give a maximum amount of cooling area in a minimum space.

Another object is to provide an apparatus for cooling the beer with a sectional hinged-door construction which will permit access to the interior for purposes of cleaning, repairs, or for other reasons of inspection.

Another object is embraced in the knockdown construction of the cooling-agent channels or pipes, which permits removal and replacing of any one of them.

In the accompanying drawings, Figure 1 is a front elevation of two of my improved apparatus for cooling beer arranged one above the other and with the lower one having its doors thrown back, but broken away to come within the limits of the sheet and with the interior of the apparatus exposed to view. Fig. 2 is a longitudinal section looking down from line $x$ $x$, Fig. 1. Fig. 3 is a vertical section on line $z$ $z$, Fig. 1, and Fig. 4 is an enlarged sectional view on line $y$ $y$, Fig. 1. Figs. 5 to 7, inclusive, represent a modified form of apparatus in which Fig. 5 is a plan view in section on A A, Fig. 7, and Fig. 6 a side elevation. Fig. 7 is a sectional view on line B B, Fig. 6.

This apparatus comprises a cast-iron casing or frame A, which is comparatively shallow from front to rear and which is open at its front. A set of doors B are loosely hinged at the sides of said receptacle and are adapted to fold inward to bring their outer edges together with a rib on one door resting in a groove on the other. Suitable packing may be placed in the groove, if desired. When the doors are closed, suitable wing-nuts and screws $b'$, hinged upon frame A at its sides, top, and bottom, are employed to draw the doors tightly against the casing A to effect a perfect sealing-joint at the edges. Similar nuts and screws lock the doors at their meeting edges.

The beer enters at the top of the apparatus through a series of suitable inlets 3 and first passes into a longitudinal chamber 4, having a slide-valve 5, provided with openings adjacent to openings in a wall 6 and whereby the amount of beer flowing to the interior 2 is regulated. Outlets 4' at the bottom of the apparatus convey the beer either to the inlets of a second similar apparatus located in line and immediately beneath, as in Fig. 1, or the beer can be otherwise taken care of if only one apparatus is used. The amount of beer going through the apparatus is regulated by slide-valve 5 with its series of openings from side to side.

In order to cool the beer in its passage through the apparatus, I provide a series of cross pipes or channels $a$ and $b$, respectively, running from side to side of the interior of its casing and arranged in staggered relation, as viewed in cross-section, Figs. 3 and 4. The pipes or channels are preferably of U shape, and when water or brine is used as a cooling agent they are preferably made of sheet-copper bent into shape with flanges 7, which are engaged and held upon their supporting plate or base by clamping brass strips 8, removably fastened to said plate by screws. When ammonia is used, said pipes are of copper-covered cast-iron.

Both the rear wall of casing A and the inner face of the door B are constructed and provided with pipes or channels $a$ and $b$, respectively; but owing to the double-door arrangement the channels or pipes $b$ on the door run only the full width of each door. Thus the description of one door will suffice for the other, and referring to Figs. 1 and 2 it will be seen that the lower or bottom channel $b$ of each door has an inlet connection 10 at one side, and the cooling agent flows through said channel to the other side of the door, and then upward through an elbow or curved duct 12 (seen in dotted lines in Fig. 3) to the next channel or pipe above, and the cooling agent is then led back through said upper channel to another elbow or curved duct 13, opening into a third and higher pipe. The water or brine or other cooling agent is conveyed back and forth from one pipe to another and has a circuitous travel over the inner face of the door from bottom to top until it is free to emerge at outlet connection 14 open to the upper or topmost passage.

The pipes or channels $a$, which are fastened to the inner wall of casing A, extend the full inner width of the beer-confining area from side to side of said casing, as seen in lower apparatus shown in Fig. 1, and the cooling agent enters through an inlet connection 15, open to the lowest or bottom pipe or channel $a$ at one end thereof, and said agent flows to the opposite side of the apparatus to an elbow or curved duct 16, formed in the back of the casing and which leads to the next higher pipe or channel. An alternate arrangement of said ducts is had at opposite sides of the casing, which open into and connect pipes $a$, to provide a continuous passage for the cooling agent to travel back and forth from side to side on its way up until it is discharged through outlet connection 16', open to the topmost pipe. The beer enters in at the top of the apparatus and the cooling agent at the bottom, thus subjecting the beer as it leaves the apparatus to the coldest surface of the apparatus.

Referring to Fig. 4, it will be seen that pipes or channels $a$ overlap pipes $b$ on the doors, and as said pipes are mounted to leave a space between them, preferably a very thin space, said space is necessarily a circuitous one, and the beer is compelled to travel from front to rear on its way down and is cooled quickly and effectively because of the enormous cooling-surface over and between which it is obliged to flow before it can escape and because of the thin film or sheet of beer which is confined between the pipes. The beer is usually under pressure and flows very rapidly.

The advantage of this apparatus consist in a large output with a small-sized apparatus, which requires very small floor-space in a brewery; also, in the accessibility to the interior by reason of the door construction, which will permit cleaning of the pipes and walls and for repairs; also, in the thin, copper-plate construction of the pipes and their relation to each other and their adaptability for ready removal.

In Figs. 5 to 7, inclusive, casing A is shown supported in a horizontal position, and elbows or ducts 18, corresponding to ducts 15' and 16, are shown in the ends 19 of the casing at the immediate ends of pipes $a$. Said pipes are herein shown as having an iron core 20 with a copper covering 21, and this is the preferred construction of pipes when brine or ammonia is used as a cooling agent.

What I claim is—

1. The two-part cooling apparatus for liquids, comprising an upright base part and a hinged part having a cooling-chamber between them, separate removable overlapping channels for a cooling agent on said parts respectively, and means to secure said channels independently in place, substantially as described.

2. The stationary upright part of the apparatus and a door constituting the opposite part thereof, said parts spaced apart and having a chamber between open at top and bottom, a series of U-shaped fluid-conducting channels horizontally one above the other on each of said parts and projecting into said chamber, flanges on said channels and means for detachably securing said channels separately in place on said parts, and inlets at the bottom and outlets at the top for the cooling agent flowing through said channels, substantially as described.

3. The apparatus having a base adapted to stand upright and a front part comprising a pair of doors hinged thereon, and said parts constructed to provide a chamber between them, separate channels removably secured one above the other in staggered relation on said parts and providing a sinuous channel for a cooling agent extending from top to bottom on the inside of each of said parts, and inlets and outlets for liquid at the top and bottom respectively of said chamber, substantially as described.

4. The front and rear parts of the apparatus separable one from the other for cleansing and having a vertical chamber between them with openings for inlet and outlet of a flowing liquid, flanged channels of non-corroding material removably mounted one above the other on the inside of each of said parts across said chamber, connecting ducts in said parts for said channels alternately arranged to provide a circuitous path for a liquid from top to bottom and having separate inlets and outlets top and bottom, substantially as described.

5. The apparatus having a chamber vertically, sheet-metal channels projecting into said chamber from its opposite walls and overlapping alternately, and removably mounted upon the inner walls of said apparatus, connecting ducts within said walls for channels on the same wall and alternately connecting said channels at opposite ends to provide a circuitous passage for the liquid from top to bottom, and a longitudinal chamber at the top of said apparatus provided with outlet-openings leading to said vertical chamber, and a slide-valve to regulate the flow of liquid through said outlet-openings, and inlets and outlets for said chambers and said channels, respectively, substantially as described.

Witness my hand to the foregoing specification this 12th day of March, 1903.

VALENTIN OPPL.

Witnesses:
R. B. MOSER,
R. ZBORNIK.